June 25, 1963   P. M. SWEENEY ETAL   3,095,187
APPARATUS FOR ISOLATING VIBRATIONS
Filed June 20, 1960   6 Sheets-Sheet 1

*INVENTORS*
LAURENCE L. EBERHART
PATRICK M. SWEENEY
BY
*Schmieding and Fultz*
ATTORNEYS June 25, 1963 P. M. SWEENEY ETAL 3,095,187
APPARATUS FOR ISOLATING VIBRATIONS
Filed June 20, 1960 6 Sheets-Sheet 2

FIG. 3

*INVENTORS*
*LAURENCE L. EBERHART*
BY *PATRICK M. SWEENEY*

*Schmieding and Fultz*
ATTORNEYS

FIG. 4

THEORETICAL VIBRATION ISOLATION CURVES

INVENTORS
PATRICK M. SWEENEY
LAURENCE L. EBERHART

BY Schmieding and Fultz
ATTORNEYS

FIG. 5
VIBRATION ISOLATION FOR 1-INCH THICK GLASS FIBER MATERIAL

FIG. 6

VIBRATION ISOLATION FOR 2-INCH THICK GLASS FIBER MATERIAL

INVENTORS
PATRICK M. SWEENEY
LAURENCE L. EBERHART

BY Schmieding and Fultz
ATTORNEYS

FIG. 7

INVENTORS
LAURENCE L. EBERHART
PATRICK M. SWEENEY
BY Schmieding and Fultz
ATTORNEYS _United States Patent Office_

3,095,187

Patented June 25, 1963

3,095,187
APPARATUS FOR ISOLATING VIBRATIONS
Patrick M. Sweeney and Laurence L. Eberhart, Dublin, Ohio, assignors to Consolidated Kinetics Corporation, Columbus, Ohio, a corporation of Ohio
Filed June 20, 1960, Ser. No. 37,504
18 Claims. (Cl. 267—1)

This invention relates to vibration isolators.

In general, the present invention relates to vibration isolation systems that utilize the unique characteristics of pads of glass fiber material provided with a flexible covering.

In one aspect of the present invention the flexible covering is impervious to air, sealed within its confines, so that the composite pad operates as a modified damped air spring. When a load is applied to the pad the compressed air confined within the impervious flexible covering supports a portion of the load and the compressed pad of glass fiber material supports a portion of the load applied to the composite pad.

As another aspect of the present invention, the flexible covering is applied to the glass fiber pad in a manner as to be pervious to permit the ingress and the egress of air to and from the confines of the pervious flexible covering when the composite pad is subjected to variations in loading. Since the flow of air is restricted by relatively small orifices, the flexible covering and the air passing into and out of its confines act as a modified damped air spring. The action of the damped air spring is modified since the variations in loading are resisted by both the fiber glass pad and the action of the air that is releasably confined within the pervious covering.

As another aspect of the present invention, the previously described composite pads are utilized in systems that maintain substantially constant natural frequencies under variations in applied loads. It has been discovered, in accordance with the present invention, that the previously described glass fiber pads have force-deflection curves that conform with the following equation $$W = W_0 e^{A(\delta - \delta_0)}$$

When a pad is subjected to a load or force substantially equal to or greater than $W_0$, the natural frequency of the system will remain constant under variations in the imposed force or supported load.

As another aspect of the present invention it has been discovered that glass fiber pads of different densities have different values of $W_0$ above which natural frequencies are maintained substantially constant. Moreover, glass fiber pads of different densities have different natural frequency values, with respect to loading, at which the natural frequency remains substantially constant. Hence, it will be understood that a vibration isolation system can be designed so as to maintain substantially constant natural frequency variations in loading by selecting fiber glass material of the proper density and by subjecting the pad to the proper load or force per unit area.

It is, therefore, an object of the present invention to provide a novel vibration isolator that functions as a damped air spring modified by the action of a pad of glass fiber material.

It is another object of the present invention to provide a novel vibration isolation system that maintains substantially constant frequencies under variations in the applied force or supported loads.

It is still another object of the present invention to provide novel vibration isolation washer constructions that function as modified damped air springs.

It is still another object of the present invention to provide novel vibration isolation washer constructions that maintain substantially constant natural frequencies under variations in applied forces or supported loads.

Further objects and advantages of the present invention will be apparent from the following description, reference being had to the accompanying drawings wherein preferred forms of embodiments of the invention are clearly shown.

Figure 1:
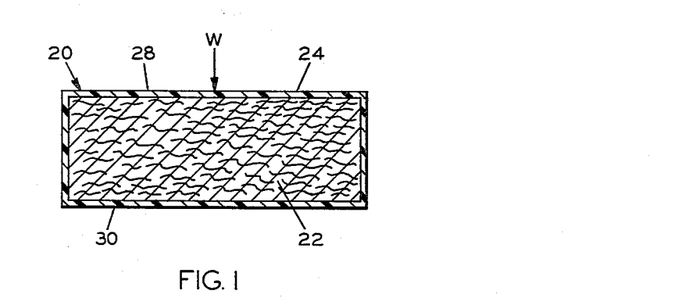
FIG. 1 is a side sectional view of a composite vibration isolation pad constructed in accordance with one aspect of the present invention, the section being taken along a vertical plane through the center line of the pad.

Referring in detail to the drawings, FIG. 1 illustrates a composite pad or air spring indicated generally at 20 that includes a pad of glass fiber material 22 provided with an air impervious flexible covering 24. The assembly functions as a modified damped air spring since the pad of glass fibers serves to damp the air spring action of the sealed air bag formed by the air impervious flexible covering 24.

Pad 20 further includes spaced load supporting sides 28 and 30 with the direction of extension of the fibers of pad 22 being substantially parallel with the planes of load supporting sides 28 and 30.

Figure 2:
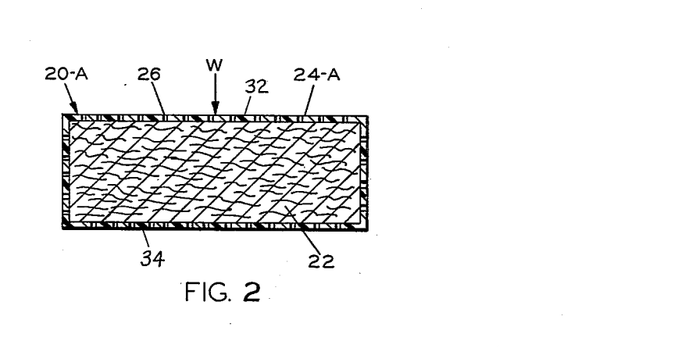
FIG. 2 is a side sectional view of a second composite vibration isolation pad constructed in accordance with another aspect of the present invention, the section being taken along a vertical plane through the center line of the pad.

FIG. 2 illustrates a modified composite pad 20–A that includes a pad or air spring of glass fiber material 22 provided with an air pervious covering 24–A. The flexible covering of FIG. 2 differs from that of FIG. 1 in that it includes a plurality of minute passages or orifices 26 that permit air to enter and leave the confines of the flexible covering when the composite pad 20–A is subjected to variations in loading. This permeable covering provides a damping action, in addition to the damping action of the glass fiber material, whereby the overall damping characteristics of the modified air spring of FIG. 2 are different from the damping characteristics of the air spring of FIG. 1.

Pad 20–A further includes spaced load supporting sides 32 and 34 with the direction of extension of the fibers of pad 22 being substantially parallel with the planes of load supporting sides 32 and 34.

Hence it will be understood that each of the pads 20 and 20–A are adapted to support compression loads "W" with the direction of force application being transverse to the direction of the glass fibers of the pads 22.

In accordance with the present invention the glass fiber pads 22 must meet certain specifications in order to be uniquely excellent for isolating vibrations. The density of the material must be greater than eight pounds per cubic foot, the diameter of the glass fibers must be less than .0005 of an inch, and the length of the glass fibers must be disposed transversely of the direction of load application. For example, fiber diameters between .00020 of an inch and .00024 of an inch gives excellent results in most applications. It has been found that fiber diameters greater than .00060 of an inch result in natural frequencies that are to high for achieving effective vibration isolation, and moreover, pads formed thereof are characterized by inadequate load bearing characteristics. By careful selection of glass fiber diameters, of the air space between the individual fibers, the density, and loading, glass fiber performs like a damped, non-linear spring due to the elasticity of the glass and the pumping action of the entrapped air. Compressing the glass fiber to heavy densities comparable to balsa wood or soft pine, large loads per unit area can be carried by the glass fiber and the damped non-linear spring action is retained.

Flexible covers 24 and 24-A can be formed of neoprene, rubber, vinyl, or other suitable flexible compositions.

Neoprene has been found to be a particularly suitable material for forming flexible covers 24 and 24-A since it possesses a high strength modulus, a high modulus of elasticity, and it is highly resistant to contaminants.

The above described glass fiber pads that include the air spaces between the individual fibers and provide the damping action described, are not impregnated with the elastomers that form the flexible covering 24 and 24-A. It will therefore be understood that the term "non-impregnated" used in the claims of the present application means that the elastomer covering material is confined to the outer region of the glass fiber pad. It will be understood that the term "non-impregnated" used in the claims does not preclude the possible use of non-bonding lubricants which might be applied to the interior fibers of the pad to minimize abrasion.

Figure 3:
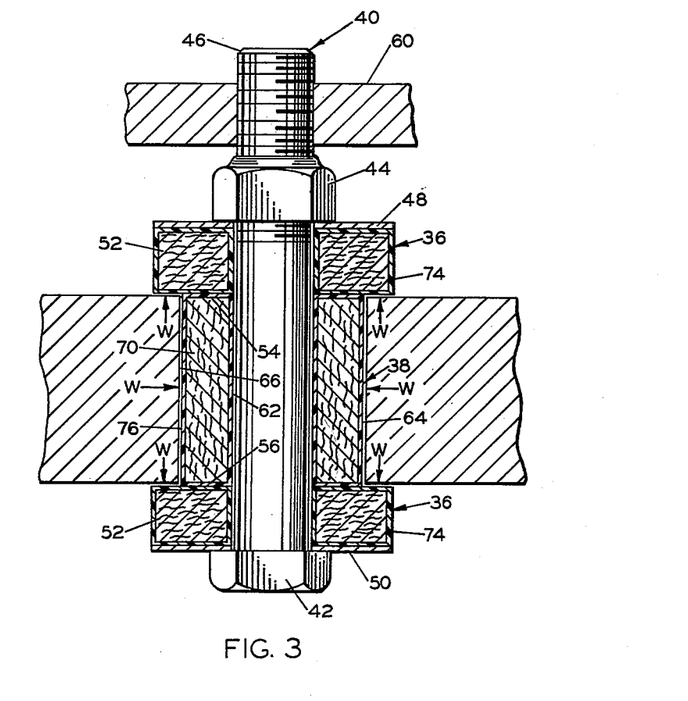
FIG. 3 is a side sectional view of two vibration isolation washer constructions formed in accordance with the present invention, the section being taken along a vertical plane through the center line of the assembly.

Reference is next made to FIG. 3 which illustrates first and second identical vibration isolation washers, each of which is indicated generally at 36 and a third cylindrical vibration isolation washer 38, said washers being shown mounted on a common mounting bolt 40 provided with a head 42 and a nut 44 mounted on a threaded end portion 46. An upper steel backing washer 48 is located between upper glass fiber washer 36 and nut 44 and a second steel backing washer 50 is located between lower glass fiber washer 36 and head 42 of bolt 40.

With continued reference to FIG. 3, washers 36 include annular glass fiber pads 52 having load supporting surfaces 54 and 56 that engage a supported load, a portion of which is indicated generally at 58. Load 58 exemplifies a typical load that is suspended from a support 60 by a plurality of bolts 40 and glass fiber washers 36 and 38.

With continued reference to FIG. 3, annular glass washer 38 includes inner force receiving wall 62 and outer force receiving wall 64.

Cylindrical washer 38 includes a cylindrical pad of glass fiber material 70, the fibers of which are substantially aligned with the force receiving walls 62 and 64. Hence, the vibratory force "W" imposed on outer force receiving wall 64 by load 58 is transmitted to cylindrical washer 38 in a direction transversely of the direction of extension of the fibers in cylindrical glass fiber pad 70.

Washers 36 are provided with a flexible coating 74 and cylindrical washer 38 is provided with a flexible coating 76. These coatings can be formed of the same materials previously discussed in connection with the glass fiber pads of FIGS. 1 and 2. Also, the coverings can be either fluid impervious or fluid pervious as desired depending on whether or not viscous dampening is desirable for the particular application.

The glass fiber pads 52 and the cylindrical glass fiber element 70 in FIG. 3 are formed of glass fiber material having the same physical characteristics previously discussed herein in connection with the glass fiber pads 22 of FIGS. 1 and 2.

It should be pointed out that the vibration isolation washers 36 and 38 can either be used to isolate support 60 from a vibrating load 58 or they can be used to isolate a stationary load 58 from a vibrating support 60.

The figure of merit for a vibration isolator is its transmissibility, the ratio of the transmitted vibratory force to the driving or forcing vibratory force, $$\text{transmissibility} = \frac{\text{transmitted force}}{\text{driving force}}$$

In order to make this small, it is necessary that the isolator have a natural or resonant frequency considerably lower than the frequency of the driving force. The resonant frequency is the number of cycles or vibrations per second at which an object on a resilient support will vibrate when it is pushed down and released suddenly. The frequency of the driving force is the number of force alternations per second. Thus, a shaft with a simple unbalance rotating at 1200 r.p.m. has a principal driving frequency of 1200/60 or 20 cycles per second (c.p.s.). Usually, the driving force has components having several frequencies, but these can be considered separately with more attention to the lower frequencies where it is more difficult to isolate vibration.

Figure 4:
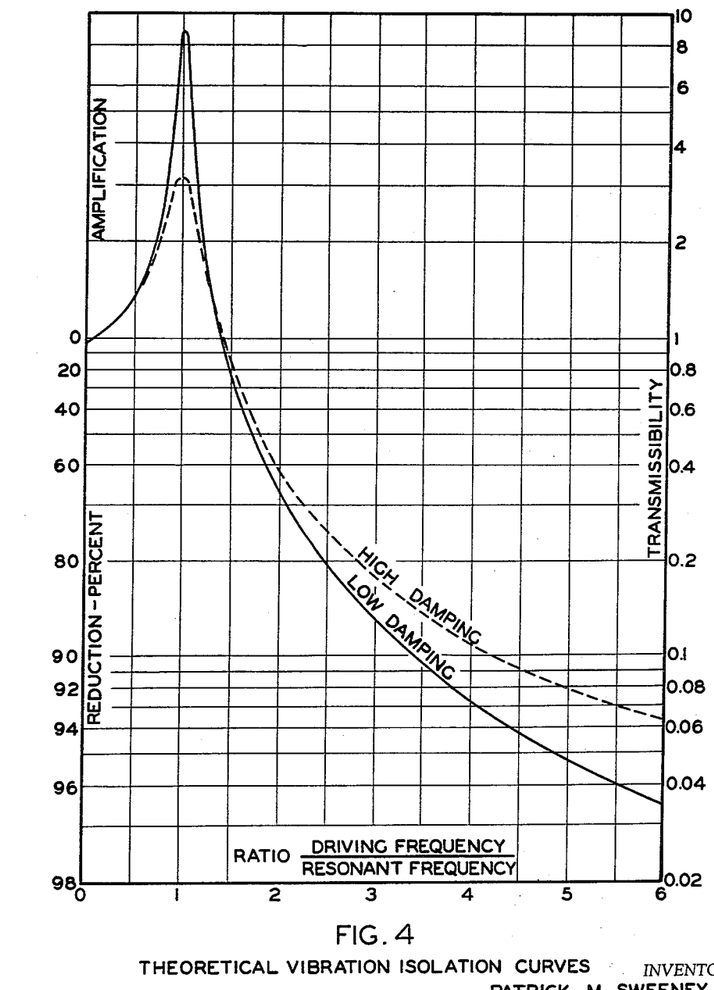
FIG. 4 is a graph illustrating theoretical vibration isolation curves.

The way in which the transmissibility depends on the resonant and driving frequencies is shown in FIG. 4. It is seen that (1) the mounting is effective only for frequency ratios greater than 1.4 (below this, there is amplification of the driving force) and (2) for a given driving frequency, the lower the resonant frequency can be made, the lower the transmissibility will be.

A low resonant frequency is obtained if the stiffness of the isolator is small and the supported weight is large. This combination, however, means a soft support and a large deflection under a static load which may be objectionable because of stability, belt pull, etc. A compromise is often called for and a ratio of frequencies between about 2.5:1 to 4:1 can usually be tolerated. This gives a transmissibility between 0.2 and 0.1, or a reduction of the vibrating force between 80 and 90 percent.

Another factor affecting transmissibility is damping or energy absorption which brings vibrating systems more or less quickly to rest after the driving force has been removed. For example, an automobile has springs to provide a low frequency suspension and has shock absorbers which abstract energy and quickly bring the system to rest after going over a bump. Referring again to FIG. 4, two curves are shown, one for low damping and the other for high damping. Some damping is advantageous near the peak of the curve where the exciting force goes through the resonance region, as in a machine coming up to speed, since this reduces extreme amplitudes, but damping in the operating frequency (speed) region detracts from the vibration isolation effect. This harmful effect is ordinarily not great and, furthermore, the damping is advantageous at higher frequencies involved in noise and shock where the simple theory does not hold.

It is pointed out that no vibration isolation mounting will be as effective as rated if the mounted machinery rests on a resonant or thin support of floor. Thus, machinery on a wooden floor or thin wall will be difficult to isolate.

There are other requirements for a practical vibration isolator aside from its performance in vibration. It must be able to withstand any thrusts necessary for the operation of the machine and must have a long life in spite of mechanical fatigue, corrosion, oxidation, contamination with dirt, oil, moisture, etc. and temperature variations. Glass fiber padding, when not overloaded, is a satisfactory material since it is rather inert chemically and is negligibly affected by the usual contaminants and temperatures.

In designing a vibration isolator, use has often been made in vibration manuals of curves of deflection under the gravity load of the machine plotted against the resonant frequency. The ratio of this frequency to the driving frequency has then been used to find the transmissibility. Except for special cases, including steel helical springs, this procedure gives lower transmissibility than is actually present. Most non-metallic materials such as rubber, plastics, and fibrous materials deflect slowly under load and also recover slowly. This non-linear action results in a dynamic stiffness for vibration which is two to four times the static stiffness under steady load. Information on transmissibility for the above materials must therefore be obtained from measurements under dynamic or vibratory test conditions.

Unlike rubber, the ratio of thickness to free surface is unimportant and a pad of large area will behave the same when it is cut up into a number of small pads of the same thickness.

Figure 5:
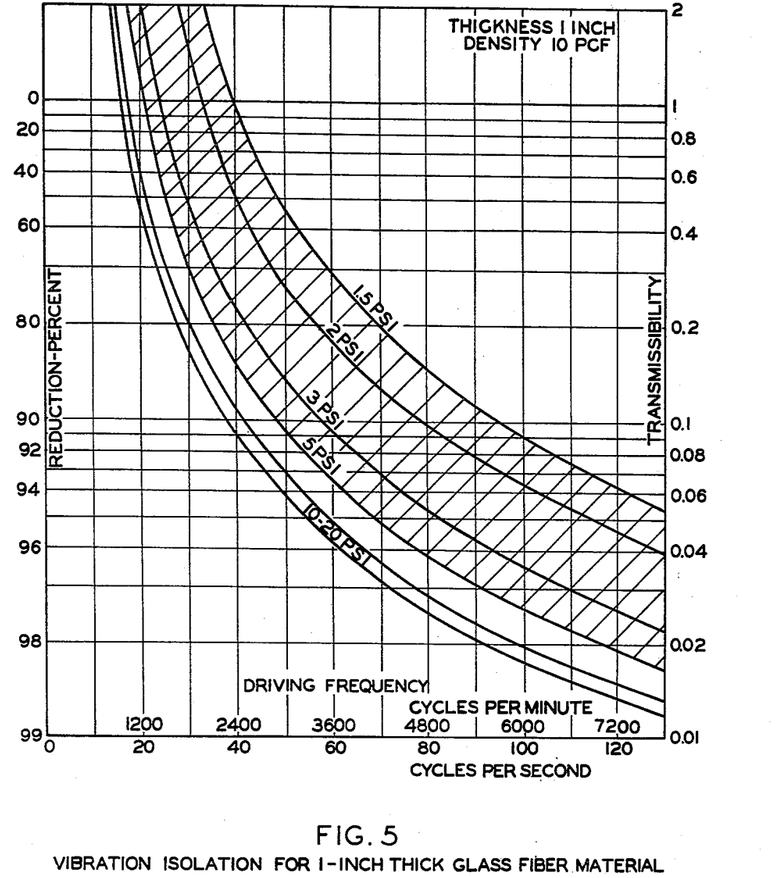
FIG. 5 is a graph showing the vibration isolation characteristics of one-inch thick glass fiber material.

Vibratory tests on glass fiber materials have been made over a considerable range of loads. The results, shown in FIG. 5 are typical for a specific density and can be used as a basis for the design of vibration isolators. Knowing the frequency of the driving force (horizontal scale), the transmissibility or vibration reduction (vertical scale) can be read from the curves for various loads and thicknesses.

For machinery vibration isolations, materials with densities of 10 pounds per cubic foot, or greater, are most practical from a load-bearing standpoint. Design curves are shown for glass fiber to be used as vibration isolation pads. Knowing the frequency of the driving force (horizontal scale), the desired transmissibility (vertical scale) can be found for various loads and thicknesses. One of the advantages of glass fiber material is that its vibration reduction is not as dependent on exact loading as the reduction for many other materials. This is because glass fiber material becomes stiffer as the load is increased and its effective resonant frequency changes less with load than the resonant frequency of many other materials. The charts show design characteristics for thicknesses of 1 and 2 inches. The reduction for other thicknesses can be found by using FIG. 5 for 1-inch and multiplying the actual driving frequency by the square root of the thickness.

Life tests under combined static and vibration loading have shown that glass fiber materials will stand up in general use at static load deflections of about 50 percent.

Figure 6:
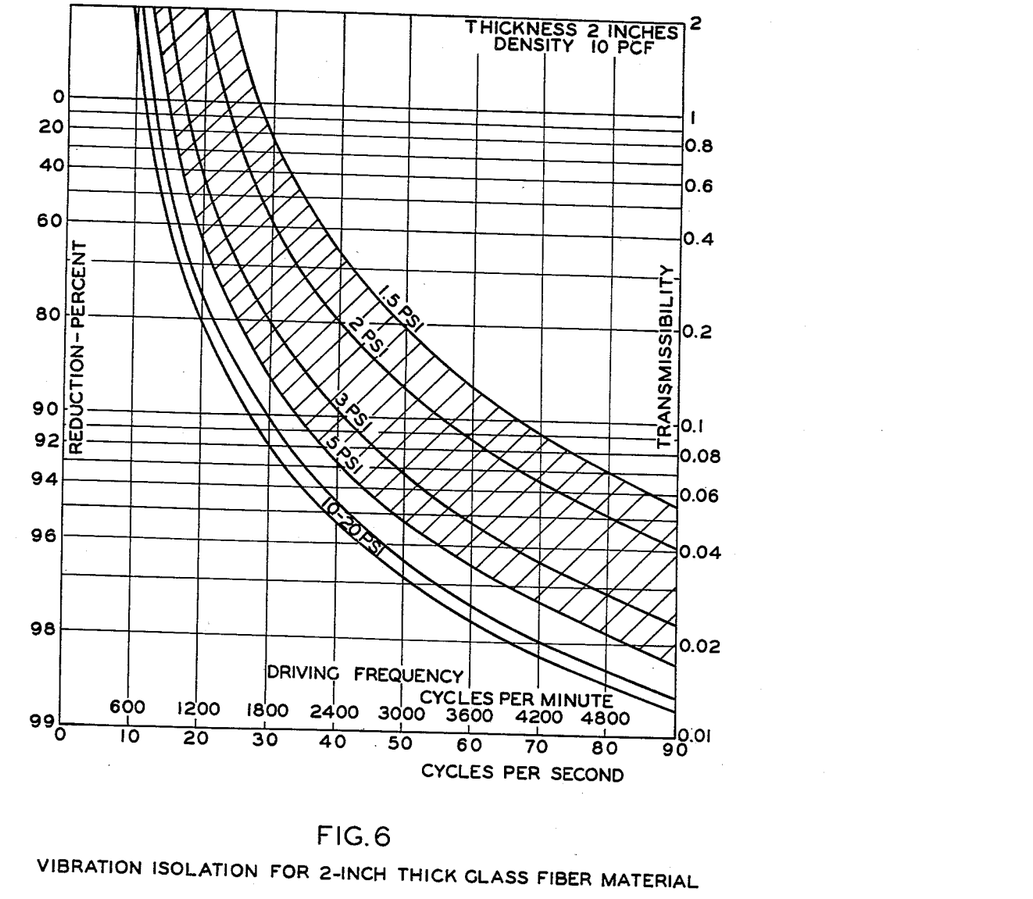
FIG. 6 is a graph showing the vibration isolation characteristics of two-inch thick glass fiber material.

As an example in using the charts, assume that it is desired to reduce the vibration of a machine by 90 percent (to ten percent) of the vibration force with no isolation. The machine weighs 100 pounds and has a driving frequency of 30 c.p.s. (a rotational speed of 1800 r.p.m.) with a simple unbalance load. On the design charts, the intersection of a horizontal line at 90 percent reduction with a vertical line at 30 c.p.s. driving frequency gives the static load. In FIG. 5, this point falls below the curves, which means that 90 percent reduction cannot be obtained for thicknesses of 1 inch or less. In FIG. 6, however, the point for 90 percent reduction at 30 c.p.s. falls just above the curves for a static pressure load of 10 to 20 p.s.i. The total area of isolating pads will be the total weight divided by the static pressure load, 50 to 100 square inches, and four pads about 4 x 4 inches should be satisfactory.

In operation, the supporting structure is designed in accordance with the graphs 5 and 6, or similar graphs for various other densities, taking into account the particular load to be supported and driving frequency to be encountered.

In accordance with the present invention it has been discovered that pads of glass fiber material of the type described herein have a unique characteristic that makes them particularly suitable for vibration isolation. This characteristic is the maintenance of constant natural frequency independent of the weight supported by the isolator. The advantage of this useful characteristic is only achieved if the pad of glass fiber material is properly loaded for any given natural frequency and for any given density of the glass fiber isolator.

Figure 7:
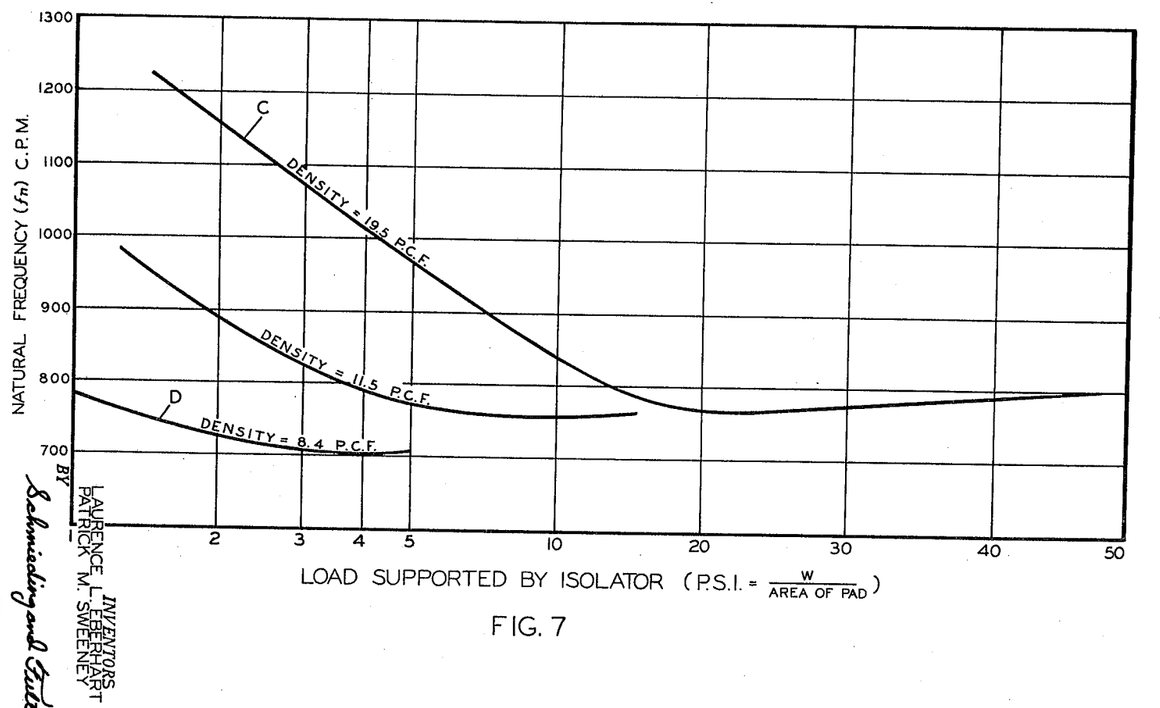
FIG. 7 is a graph showing the relationship between natural frequencies and variations in loads being supported by vibration isolation supports constructed in accordance with the present invention.

FIG. 7 is a graph showing the variations of natural frequency $f_n$ with respect to variations in the load W supported by the isolator for various densities of glass fiber materials ranging between 8.4 and 19.5 pounds per cubic foot.

This unique characteristic of maintaining constant natural frequency can be defined mathematically since the glass fiber pads behave as isolators having a non-linear force deflection curve whose stiffness $k_y$ remains proportional to the weight of the mounted body W at all points on the force-deflection curve. The right side of the below listed equation reduces to a constant, and the natural frequency becomes independent of the weight supported by the isolator.

(1) $$f_n = 3.13 \sqrt{\frac{k_y}{W}}$$

Substituting $k_y = dW/d\delta$ in Equation 1 (the force F is equal to the supported weight W) and rearranging terms:

(2) $$\frac{4\pi^2 f_n^2}{g} d\delta = \frac{dW}{W}$$

An expression for the force deflection curve is obtained from the integration of Equation 2. A family of curves results from this process, depending on the constant of integration. A particular curve is specified by selecting a point with the coordinates $W_0$, $\delta_0$ such that all points of the curve whose coordinates are numerically greater than $W_0$, $\delta_0$ will represent conditions of constant natural frequency. Integrating Equation 2:

(3) $$\frac{4\pi^2 f_n^2}{g} \delta \Big|_{\delta_0}^{\delta} = \log W \Big|_{W_0}^{W}$$

Equation 3 may be written exponentially as follows:

(4) $$W = W_0 e^{A(\delta - \delta_0)}$$

An isolator whose force-deflection curve conforms to Equation 4 thus exhibits a constant natural frequency $f_n$ when supporting any load greater than $W_0$.

With reference to FIG. 7, the natural frequency of curve C (19.5 pounds per cubic foot density) remains substantially constant at 780 cycles per minute when the weight of the mounted body W is greater than $W_0$, with $W_0$ being equal to approximately 17 pounds as seen from the abscissa of the graph of FIG. 7 when the weight W of the mounted body is less than $W_0$ (17 pounds), the natural frequency shows the inverse tendency which is characteristic of linear isolators.

With continued reference to FIG. 7 the characteristic of a lower density isolator is illustrated by curve D. Curve D represents a density of the glass fiber material of 8.4 pounds per cubic foot. Here $W_0$ occurs approximately at 3¼ pounds load. Above this loading natural frequency remains substantially constant with variation in load and below this loading the natural frequency shows the inverse tendency which is characteristic of linear isolators.

In the formulas previously discussed herein the following symbols are defined as follows:

$W$, actual load applied to isolator
$W_0$, load above which natural frequency is independent of variations in load W
$\delta$, deflection of isolator under load W
$\delta_0$, deflection of isolator under load $W_0$
$f_n$, natural frequency
$k_y$, stiffness of isolator
$e$, the basis for the Napierian system of logarithms
$g$, gravitational constant
$\pi$, 3.1416

$$A, \frac{4\pi^2 f_n^2}{g}$$

While the forms of embodiments of the present invention as herein disclosed constitute preferred forms, it is to be understood that other forms might be adopted, all coming within the scope of the claims which follow.

We claim:

1. An air and glass fiber spring for isolating vibrations comprising, in combination, a pad of non-impregnated glass fiber material including a load supporting side, the fibers of said material being cross-wise oriented substantially parallel with said load supporting side; and a flexible material covering said pad of glass fiber material, the interior regions of said pad including impregnant free interstices.

2. An air and glass fiber spring for isolating vibrations comprising, in combination, a pad of non-impregnated glass fiber material including a load supporting side, the fibers of said material being cross-wise oriented substantially parallel with said load supporting side; and an air impervious flexible material covering said pad of glass fiber material, the interior regions of said pad including impregnant free interstices.

3. An air damped spring for isolating vibrations comprising, in combination, a pad of non-impregnated glass fiber material including a load supporting side, the fibers of said material being cross-wise oriented substantially parallel with said load supporting side; and an air pervious flexible material covering said pad of glass fiber material, the interior regions of said pad including impregnant free interstices.

4. A vibration isolation system having a substantially constant natural frequency under variations in the weight of a supported load, said system comprising, in combination, a pad of non-impregnated glass fiber material including a load supporting side, the fibers of said material being cross-wise oriented less than .0005 of an inch in diameter, said pad having a force-deflection curve conforming to the equation $$W = W_0 e^{A(\delta - \delta_0)}$$

a load supported by said pad and having a weight substantially equal to or greater than $W_0$, the fibers of said material being extended transversely to the direction of application of said load; and a flexible covering for said pad of glass fiber material, the interior regions of said pad including impregnant-free interstices, the symbols in said equation being defined as follows:

$W$ = actual load applied to the pad
$W_0$ = load above which the natural frequency of the system is independent of variations in the actual load $W$
$e$ = the base for the Napierian system of logarithms
$A = \dfrac{4\pi^2 f_n^2}{g}$
$\delta$ = deflection of the pad under load $W$
$\delta_0$ = deflection of the pad under load $W_0$
$\pi = 3.1416$
$f_n$ = natural frequency of the system
$g$ = the gravitational constant 5. A vibration isolation system having a substantially constant natural frequency under variations in the weight of a support load, said system comprising, in combination, a pad of non-impregnated glass fiber material including a load supporting side, the fibers of said material being cross-wise oriented less than .0005 of an inch in diameter, said pad having a force-deflection curve conforming to the equation $$W = W_0 e^{A(\delta - \delta_0)}$$

a load supported by said pad and having a weight substantially equal to or greater than $W_0$, the fibers of said material being extended transversely to the direction of application of said load; and an air impervious flexible covering for said pad of glass fiber material, the interior regions of said pad including impregnant-free interstices, the symbols in said equation being defined as follows:

$W$ = actual load applied to the pad
$W_0$ = load above which the natural frequency of the system is independent of variations in the actual load $W$
$e$ = the base for the Napierian system of logarithms
$A = \dfrac{4\pi^2 f_n^2}{g}$
$\delta$ = deflection of the pad under load $W$
$\delta_0$ = deflection of the pad under load $W_0$
$\pi = 3.1416$
$f_n$ = natural frequency of the system
$g$ = the gravitational constant 6. A vibration isolation system having a substantially constant natural frequency under variations in the weight of a supported load, said system comprising, in combination, a pad of non-impregnated glass fiber material including a load supporting side, the fibers of said material being cross-wise oriented less than .0005 of an inch in diameter, said pad having a force-deflection curve conforming to the equation $$W = W_0 e^{A(\delta - \delta_0)}$$

a load supported by said pad and having a weight substantially equal to or greater than $W_0$, the fibers of said material being extended transversely to the direction of application of said load; and an air pervious flexible covering for said pad of glass fiber material, the interior regions of said pad including impregnant-free interstices, the symbols in said equation being defined as follows:

$W$ = actual load applied to the pad
$W_0$ = load above which the natural frequency of the system is independent of variations in the actual load $W$
$e$ = the base for the Napierian system of logarithms
$A = \dfrac{4\pi^2 f_n^2}{g}$
$\delta$ = deflection of the pad under load $W$
$\delta_0$ = deflection of the pad under load $W_0$
$\pi = 3.1416$
$f_n$ = natural frequency of the system
$g$ = the gravitational constant 7. A washer for isolating vibrations comprising, in combination, a pad of non-impregnated glass fiber material including a central hole and spaced load supporting sides, the fibers of said material being cross-wise oriented substantially parallel with the planes of said load supporting sides; and a flexible material covering said pad of glass fiber material, the interior regions of said pad including impregnant free interstices.

8. A washer for isolating vibrations comprising, in combination, a pad of non-impregnated glass fiber material including a central hole and spaced load supporting sides, the fibers of said material being cross-wise oriented substantially parallel with the planes of said load supporting sides; and an air impervious flexible material covering said pad of glass fiber material, the interior regions of said pad including impregnant free interstices.

9. A washer for isolating vibrations comprising, in combination, a pad of non-impregnated glass fiber material including a central hole and spaced load supporting sides, the fibers of said material being cross-wise oriented substantially parallel with the planes of said load supporting sides; and an air pervious flexible material covering said pad of glass fiber material, the interior regions of said pad including impregnant free interstices.

10. A vibration isolating washer comprising, in combination, a cylindrical pad of non-impregnated glass fiber material including an outer cylindrical wall and an inner cylindrical wall forming a hole, the fibers of said material being cross-wise oriented substantially parallel with said cylindrical walls; and a flexible material covering for said pad of glass fiber material, the interior regions of said pad including impregnant free interstices.

11. A vibration isolating washer comprising, in combination, a cylindrical pad of non-impregnated glass fiber material including an outer cylindrical wall and an inner cylindrical wall forming a hole, the fibers of said material being cross-wise oriented substantially parallel with said cylindrical walls; and an air impervious flexible material covering said pad of glass fiber material, the interior regions of said pad including impregnant free interstices.

12. A vibration isolating washer comprising, in combination, a cylindrical pad of non-impregnated glass fiber material including an outer cylindrical wall and an inner cylindrical wall forming a hole, the fibers of said material being cross-wise oriented substantially parallel with said cylindrical walls; and an air pervious flexible material covering said pad of glass fiber material, the interior regions of said pad including impregnant free interstices.

13. A vibration isolation system having a substantially constant natural frequency under variations in the weight of a supported load, said system comprising, in combination, a pad of non-impregnated glass fiber material including a central hole and spaced load supporting sides, the fibers of said material being cross-wise oriented less than .0005 of an inch in diameter, said pad having a force-deflection curve conforming to the equation $$W = W_0 e^{A(\delta - \delta_0)}$$

a load exerting a force on said pad substantially equal to or greater than $W_0$, the fibers of said material being extended transversely to the direction of application of said load; and a flexible covering for said pad of glass fiber material, the interior regions of said pad including impregnant-free interstices, the symbols in said equation being defined as follows:

$W$ = actual load applied to the pad
$W_0$ = load above which the natural frequency of the system is independent of variations in the actual load W
$e$ = the base for the Napierian system of logarithms $$A = \frac{4\pi^2 f_n^2}{g}$$

$\delta$ = deflection of the pad under load W
$\delta_0$ = deflection of the pad under load $W_0$
$\pi$ = 3.1416
$f_n$ = natural frequency of the system
$g$ = the gravitational constant 14. The system defined in claim 13 wherein said flexible covering is impervious to air.

15. The system defined in claim 13 wherein said covering is pervious to air.

16. A vibration isolation system having a substantially constant natural frequency under variations in the weight of a supported load, said system comprising, in combination, a cylindrical pad of non-impregnated glass fiber material including an outer cylindrical wall and an inner cylindrical wall forming a hole, the fibers of said material being cross-wise oriented less than .0005 of an inch in diameter, said pad having a force deflection curve conforming to the equation $$W = W_0 e^{A(\delta - \delta_0)}$$

a load exerting a force on said cylindrical walls of said washer, said force being substantially equal to or greater than $W_0$, the fibers of said material being extended transversely to the direction of application of said load; and a flexible covering for said pad of glass fiber material, the interior regions of said pad including impregnant-free interstices, the symbols in said equation being defined as follows:

$W$ = actual load applied to the pad
$W_0$ = load above which the natural frequency of the system is independent of variations in the actual load W
$e$ = the base for the Napierian system of logarithms $$A = \frac{4\pi^2 f_n^2}{g}$$

$\delta$ = deflection of the pad under load W
$\delta_0$ = deflection of the pad under load $W_0$
$\pi$ = 3.1416
$f_n$ = natural frequency of the system
$g$ = the gravitational constant 17. The vibration isolation system defined in claim 16 wherein said flexible covering is impervious to air.

18. The vibration isolation system defined in claim 16 wherein said flexible covering is pervious to air.

References Cited in the file of this patent

UNITED STATES PATENTS

| | | |
|---|---|---|
| 2,387,266 | Holland | Oct. 23, 1945 |
| 2,395,949 | Wilkins | Mar. 5, 1946 |
| 2,689,122 | Musikant | Sept. 14, 1954 |
| 2,769,741 | Schwartz | Nov. 6, 1956 |
| 2,856,035 | Rohacs | Oct. 14, 1958 |
| 2,859,959 | Hardigg | Nov. 11, 1958 |
| 2,969,971 | Nelson | Jan. 31, 1961 |
| 3,018,991 | Slayter | Jan. 30, 1962 |